United States Patent
Kim et al.

(10) Patent No.: US 11,076,089 B2
(45) Date of Patent: *Jul. 27, 2021

(54) APPARATUS AND METHOD FOR PRESENTING SPECIFIED APPLICATIONS THROUGH A TOUCH SCREEN DISPLAY

(71) Applicant: Samsung Electronics Co., Ltd., Gyeonggi-do (KR)

(72) Inventors: Kyunghwa Kim, Seoul (KR); Seonhwa Kim, Seoul (KR); Mijung Park, Gyeonggi-do (KR); Saegee Oh, Gyeonggi-do (KR); Sihak Jang, Gyeonggi-do (KR); Joah Choi, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 15/897,810

(22) Filed: Feb. 15, 2018

(65) Prior Publication Data

US 2018/0176478 A1 Jun. 21, 2018

Related U.S. Application Data

(63) Continuation of application No. 14/262,002, filed on Apr. 25, 2014, now Pat. No. 9,900,515.

(30) Foreign Application Priority Data

Apr. 25, 2013 (KR) .......................... 10-2013-0045893

(51) Int. Cl.
*H04N 5/232* (2006.01)
*G06F 3/0486* (2013.01)
(Continued)

(52) U.S. Cl.
CPC ....... *H04N 5/23219* (2013.01); *G06F 3/0482* (2013.01); *G06F 3/0486* (2013.01);
(Continued)

(58) Field of Classification Search
CPC ............ H04N 5/23293; H04N 5/23219; G06F 3/0482; G06F 3/04842; G06F 16/583;
(Continued)

(56) References Cited

U.S. PATENT DOCUMENTS 7,503,014 B2 3/2009 Tojo
7,676,543 B2 3/2010 Homer et al.
(Continued)

FOREIGN PATENT DOCUMENTS

EP 2 293 531 3/2011
EP 2 492 791 8/2012
(Continued)

OTHER PUBLICATIONS

European Search Report dated Oct. 13, 2014 issued in counterpart application No. 14165990.4-1855.
(Continued)

*Primary Examiner* — Luong T Nguyen
(74) *Attorney, Agent, or Firm* — The Farrell Law Firm, P.C.

(57) ABSTRACT

A method of processing information of a portable device includes displaying a preview image output from a camera when a camera application is executed; displaying communication applications corresponding to recognition information of a selected image in the displayed preview image; executing a selected communication application among the displayed communication applications; and transmitting a content/file through the communication application.

20 Claims, 14 Drawing Sheets

(51) Int. Cl.
  *G06F 3/0482* (2013.01)
  *G06F 3/0484* (2013.01)
  *G06K 9/00* (2006.01)
  *H04M 1/27475* (2020.01)
  *G06F 16/583* (2019.01)
  *H04M 1/72403* (2021.01)
  *H04M 1/72469* (2021.01)

(52) U.S. Cl.
  CPC ...... *G06F 3/04842* (2013.01); *G06F 3/04845* (2013.01); *G06F 16/583* (2019.01); *G06K 9/00221* (2013.01); *H04M 1/72403* (2021.01); *H04M 1/72469* (2021.01); *H04N 5/23293* (2013.01); *H04M 1/27475* (2020.01); *H04M 2250/22* (2013.01); *H04M 2250/52* (2013.01); *H04M 2250/64* (2013.01)

(58) Field of Classification Search
  CPC .............. G06F 3/0486; G06F 3/04845; G06K 9/00221; H04M 1/72522; H04M 1/72583; H04M 1/27475; H04M 2250/22; H04M 2250/52; H04M 2250/06; H04M 1/72469; H04M 1/72403; H04M 2250/64
  See application file for complete search history.

(56) References Cited

U.S. PATENT DOCUMENTS

| | | | | |
|---|---|---|---|---|
| 8,094,242 B2* | 1/2012 | Takata | ............... | G06F 1/1626 |
| | | | | 348/130 |
| 8,363,952 B2 | 1/2013 | Bigiol et al. | | |
| 8,392,957 B2 | 3/2013 | Holt et al. | | |
| 8,498,451 B1 | 7/2013 | Agopian et al. | | |
| 8,520,907 B2 | 8/2013 | Lai | | |
| 8,520,979 B2* | 8/2013 | Conwell | ............... | G06K 9/228 |
| | | | | 382/305 |
| 8,533,265 B2* | 9/2013 | Bardsley | ............... | G06F 16/58 |
| | | | | 709/204 |
| 8,798,684 B2* | 8/2014 | Lee | ............... | H04M 1/72583 |
| | | | | 455/566 |
| 8,880,717 B2* | 11/2014 | Yang | ............... | H04L 12/2816 |
| | | | | 709/231 |
| 8,910,053 B2 | 12/2014 | Am | | |
| 9,304,659 B2 | 4/2016 | Sherrard | | |
| 9,900,515 B2* | 2/2018 | Kim | ............... | H04N 5/23293 |
| 2004/0145660 A1 | 7/2004 | Kusaka | | |
| 2008/0024632 A1 | 1/2008 | Otsuka | | |
| 2008/0176602 A1* | 7/2008 | Kim | ............... | H04M 1/27475 |
| | | | | 455/564 |
| 2009/0007016 A1 | 1/2009 | Lindberg et al. | | |
| 2009/0237546 A1* | 9/2009 | Bloebaum | ............... | G06F 3/011 |
| | | | | 348/333.01 |
| 2011/0043643 A1 | 2/2011 | Yu | | |
| 2011/0237229 A1* | 9/2011 | Shimagaki | ............... | H04M 1/27475 |
| | | | | 455/414.1 |
| 2012/0009924 A1 | 1/2012 | Lee | | |
| 2012/0141039 A1 | 6/2012 | Yang et al. | | |
| 2013/0187862 A1* | 7/2013 | Jan | ............... | G06F 3/0484 |
| | | | | 345/173 |
| 2014/0068519 A1 | 3/2014 | Nam | | |
| 2014/0267796 A1 | 9/2014 | Jang | | |
| 2015/0146071 A1 | 5/2015 | Yi | | |

FOREIGN PATENT DOCUMENTS

| | | |
|---|---|---|
| EP | 2 778 989 | 9/2014 |
| KR | 1020090066103 | 6/2009 |
| KR | 1020100000936 | 1/2010 |
| KR | 1020110016167 | 2/2011 |
| WO | WO 2012/099315 | 7/2012 |
| WO | WO 2013/154476 | 10/2013 |

OTHER PUBLICATIONS

Korean Office Action dated Feb. 18, 2019 issued in counterpart application No. 10-2013-0045893, 10 pages.

* cited by examiner

APPARATUS AND METHOD FOR PRESENTING SPECIFIED APPLICATIONS THROUGH A TOUCH SCREEN DISPLAY

PRIORITY

This application is a continuation of U.S. patent application Ser. No. 14/262,002, which was filed on Apr. 25, 2014 and which claims priority under 35 U.S.C. § 119(a) to Korean Patent Application No. 10-2013-0045893, filed in the Korean Intellectual Property Office on Apr. 25, 2013, the entire content of which is incorporated herein by reference.

BACKGROUND OF THE INVENTION

1. Field of the Invention

The present invention generally relates to an apparatus and method for transmitting information of a portable device, and more particularly, to an apparatus and a method for transmitting information using information recognized in an image.

2. Description of the Related Art

When two or more applications are executed at the same time by separating a screen in a portable device, each of the applications operates independently from the other. That is, the conventional method focuses on multi-tasking in which the concurrently executed applications operate independently from each other.

In this case, when other related applications are executed while an application is executed in the portable device, information may not be shared among the concurrently executed applications. For example, it is difficult to recognize an image by executing a camera application and to share information recognized from the image with another application being executed. Further, when a moving image or a file is viewed, if it is desired that the moving image or the file is transmitted to another device or a person, the application executing the moving image or file viewing must be terminated or stopped, a communication application is then executed, and then the moving image or the file is attached and transmitted.

SUMMARY OF THE INVENTION

The present invention has been made to address the above problems and disadvantages, and to provide at least the advantages described below. Accordingly, an aspect of the present invention provides an apparatus and method for displaying a plurality of applications on one screen in a portable device, interworking applications by transmitting contents and/or commands among displayed applications, and transmitting the contents and/or command. Another aspect of the present invention provides an apparatus and method in which a camera application and another application are simultaneously or sequentially executed, an image (a preview image) displayed by the camera application is recognized in real time, and the recognized information is connected to another application or contents and transmitted.

According to an aspect of the present invention, a method of processing information of a portable device includes displaying a preview image output from a camera when a camera application is executed; displaying communication applications corresponding to recognition information of a selected image in the displayed preview image; executing a selected communication application among the displayed communication applications; and transmitting a content/file through the communication application.

According to another aspect of the present invention, an apparatus for processing information of a portable device includes a camera; a display unit that displays application information; and a controller that displays a preview image on the display unit output from the camera, displays a communication application according to recognition information of a selected image from the displayed preview image, executes a selected communication application from the displayed communication applications, and transmits a content/file.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
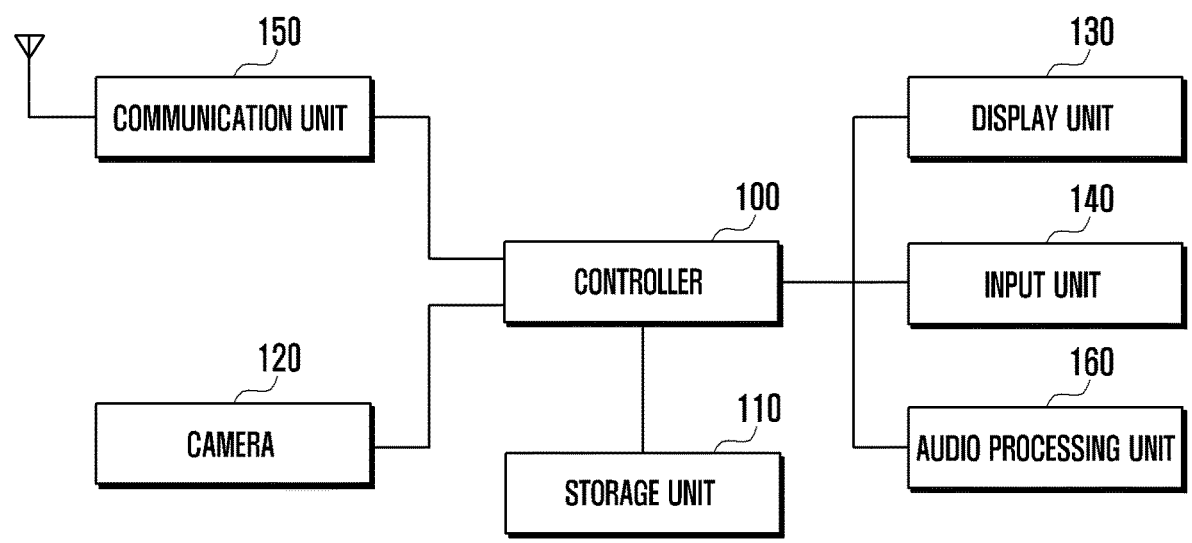
FIG. 1 is a block diagram illustrating a configuration of a portable device according to an embodiment of the present invention.

Hereinafter, embodiments according to the present invention will be described in detail with reference to the accompanying drawings. It shall be noted that in the following description, the same elements will be designated by the same reference numerals although they are shown in different drawings.

A portable device according to an embodiment of the present invention relates to an apparatus and a method for enabling a camera application to interwork with other applications. Information of a device is recognized from a preview image of a camera, the recognition result is shared with other applications in the device, and a content and/or a file can be transmitted. The portable device according to an embodiment of the present invention executes a camera application when executing a content/file viewing function, recognizes a preview image output from the camera, executes a communication application according to the recognized information, and transmits the content/file. At this point, the recognized information may be communication information or information on an external device.

In a portable device including a camera, when the camera is driven, a preview image output from the camera is recognized, and a content and/or a file being executed (or selected) is transmitted through an external apparatus or a communication network using information of the recognized image.

FIG. 1 is a block diagram illustrating a configuration of a portable device according to an embodiment of the present invention. Here, the portable device may be various kinds of digital apparatuses such as a cellular phone, including a smart phone, an MP3 player, a tablet computer, a personal computer, and the like.

Referring to FIG. 1, a communication unit 150 performs a wireless communication function with a base station, an Internet server, or the like. The communication unit 150 includes a transmitter that up-converts frequencies of a transmission signal and performs power amplification on the transmission signal, a receiver that performs low noise amplification on a reception signal and down-converts frequencies of the reception signal, and the like. Further, the communication unit 150 may include a modulator and a demodulator. The modulator modulates a transmission signal and transmits the transmission signal to the transmitter, and the demodulator demodulates a signal received through the receiver. In this case, the modulator/demodulator may be a communication unit for Long Term Evolution (LTE), Wideband Code Division Multiple Access (WCDMA), Global System for Mobile communication (GSM), and the like, a communication unit for Wireless Fidelity (WiFi), Wireless Broadband (WiBro), or the like, or a communication unit for Near Field Communication (NFC), Bluetooth, and the like. In the embodiment of the present invention, it is assumed that the communication unit 150 includes a communication unit for LTE, WiFi, NFC, and Bluetooth.

A camera 120 is driven under the control of a controller 100, and captures an image of a subject. Here, an image captured by the camera 120 may be a preview image. The camera 120 may include a rear camera provided on the rear side of the device that can capture an image in a high resolution, and a front camera provided on the front side of the device that can capture an image in a relatively lower resolution than the rear camera.

The controller 100 controls an entire operation of a portable device, recognizes a preview image captured according to an embodiment of the present invention, and enables a content/file with other applications using information of the recognized image. For this, the controller 100 may include an image recognition unit. Accordingly, if it is requested to drive the camera 120 for causing the content/file to interwork with the other applications, the controller 100 recognizes the preview image output from the camera 120 to extract information on the image, and causes the other applications to interwork using the extracted information.

A storage unit 110 may include a program memory that stores a program for operating the terminal and a program according to the embodiment of the present invention, and a data memory that stores tables for operating the terminal and data generated during execution of a program.

A display unit 130 displays information on a currently-executed application under the control of the controller 100. The display unit 130 may be a Liquid Crystal Display (LCD) or an Organic Light Emitting Diode (OLED). The input unit 140 may be implemented by a capacitive type or a resistive type, and the input unit 140 outputs position information of a touch, such as a finger touch, of the user to the controller 100. The input unit 140 may further include an ElectroMagnetic Resonance (EMR) sensor pad to sense a pen touch input and output the pen touch input to the controller 100. Here, the display unit 130 and the input unit 140 may be configured in an integrated type.

An audio processing unit 160 processes an audio signal generated in a communication mode under the control of the controller 100, and may process an audio signal with respect to a photograph in a camera capturing mode.

In a portable device in the configuration described above, the controller 100 executes two or more applications simultaneously or sequentially, and performs control to extract information from one application and to connect the one application to the currently-executed other applications so that information is shared. Here, the one application among applications may be a camera application. The camera application may be an application to share information among applications and operates in a mode different from a general mode for driving a camera. Further, execution of the camera application for sharing may be performed by a camera application menu in a share via menu. In this case, if the share via menu can be selected in a state of executing a certain application, a state of displaying a certain file, or an idle state, and a camera application can be set in the share via menu, the controller 100 senses the setting of the camera application as a request to execute the camera application for sharing information between applications. That is, the camera application for sharing the information may be executed in all screens that can set a share via function.

Further, if a user requests to drive a camera application for sharing application information, the controller 100 drives the camera 120, recognizes a preview image output from the camera 120, and extracts information on the other applications for sharing a content/file with. Here, the other applications may be an application for transmitting the content/file to an external device, a communication application (MMS (Multimedia Message Service), EMS (E-Mail Message Service), SNS (Social Network Service), or the like) for transmitting the content/file from the device, or the like. The controller 100 executes the other applications according to the extracted information and transmits the content/file.

Figure 2:
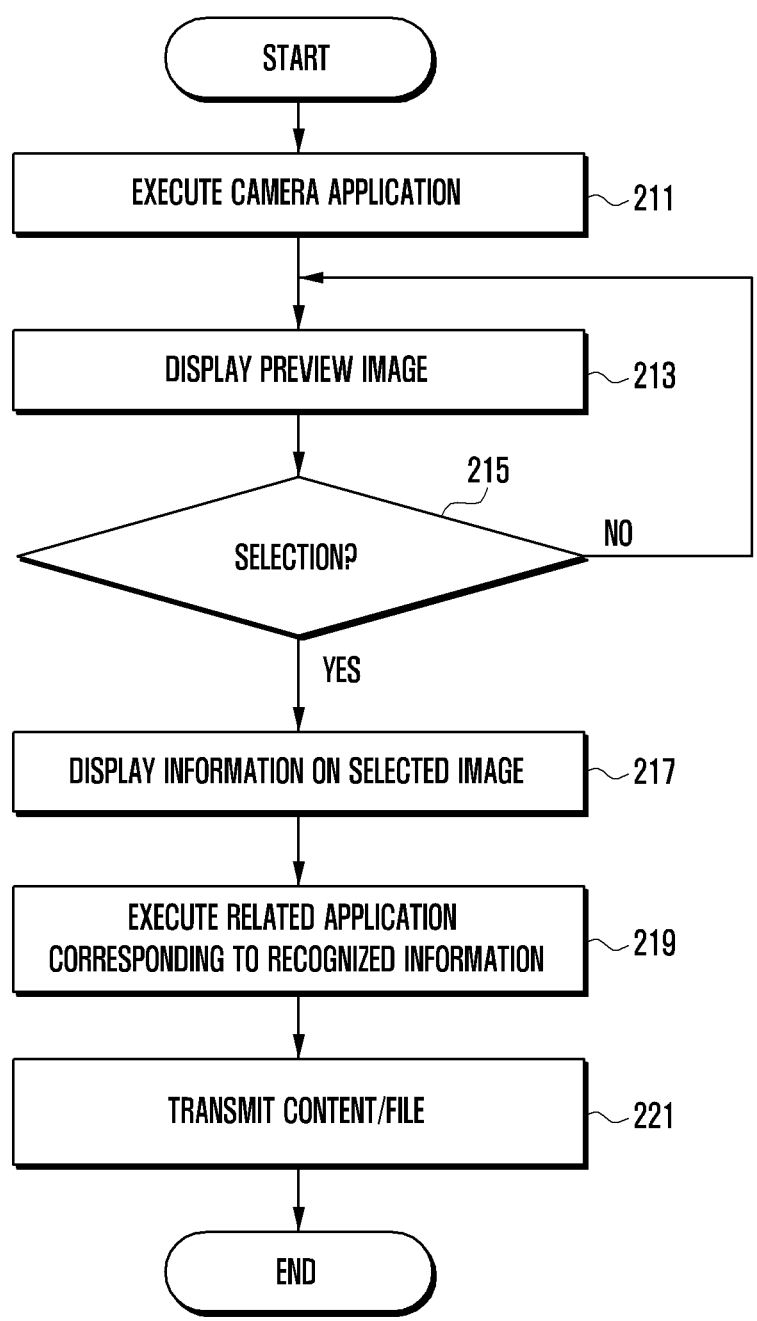
FIG. 2 is a flowchart illustrating an application processing procedure in a portable device according to an embodiment of the present invention.
Figure 3A:
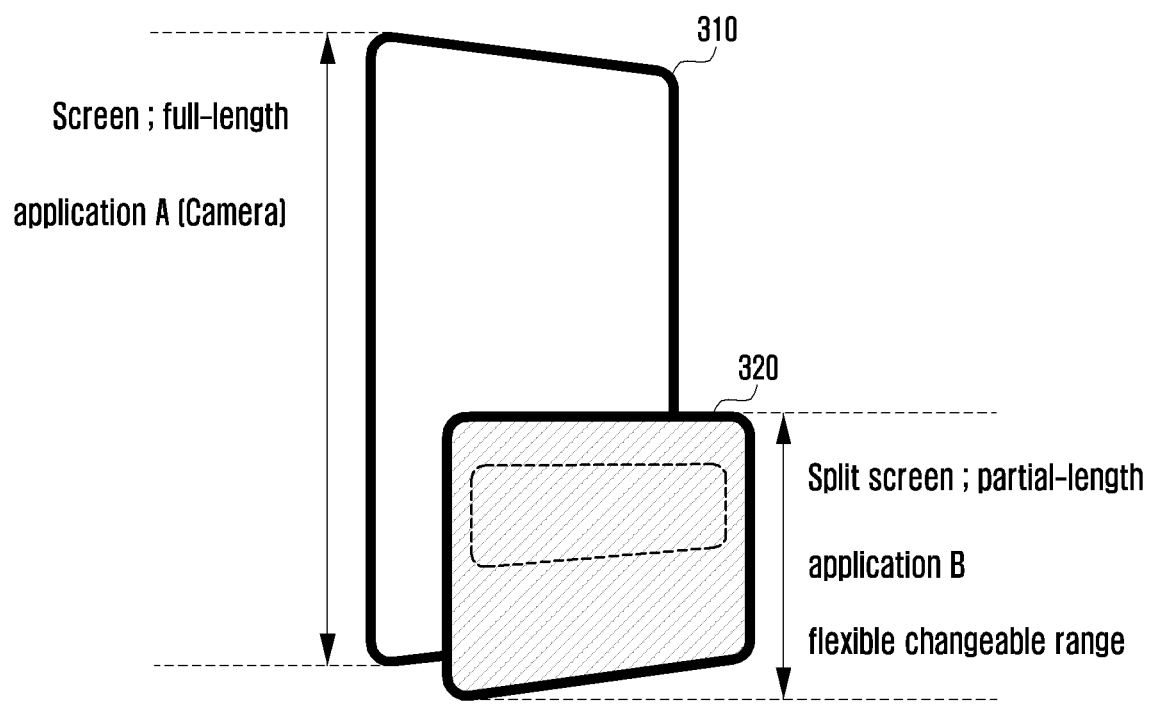
FIGS. 3A and 3B are diagrams illustrating examples of displaying screens of executed applications when two applications are executed.
Figure 3B:
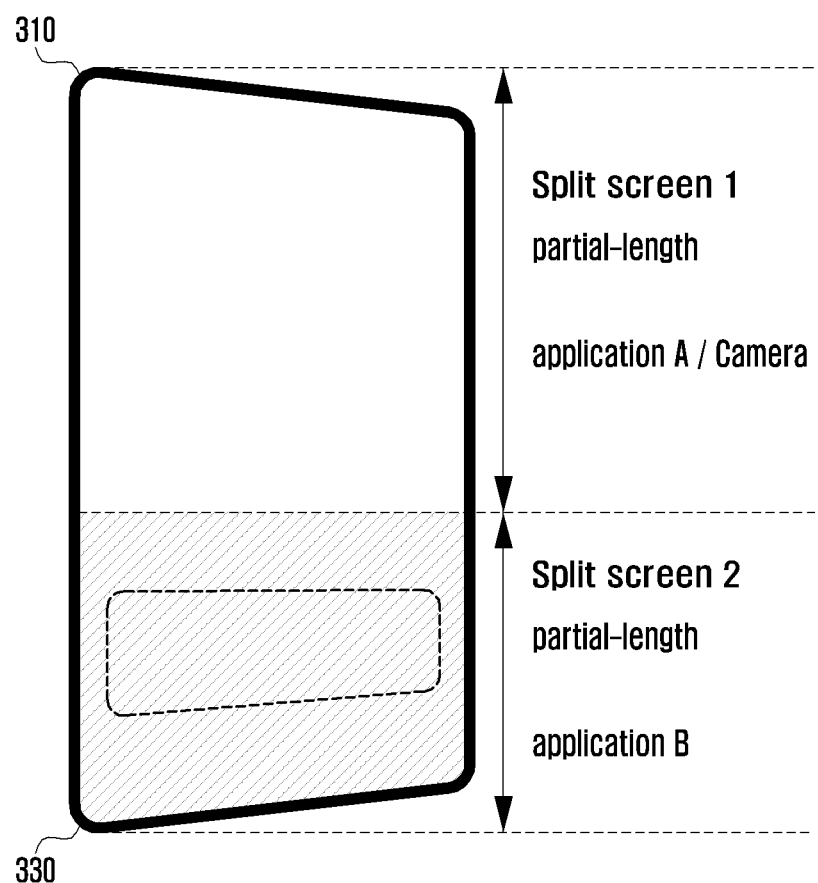
Figure 4A:
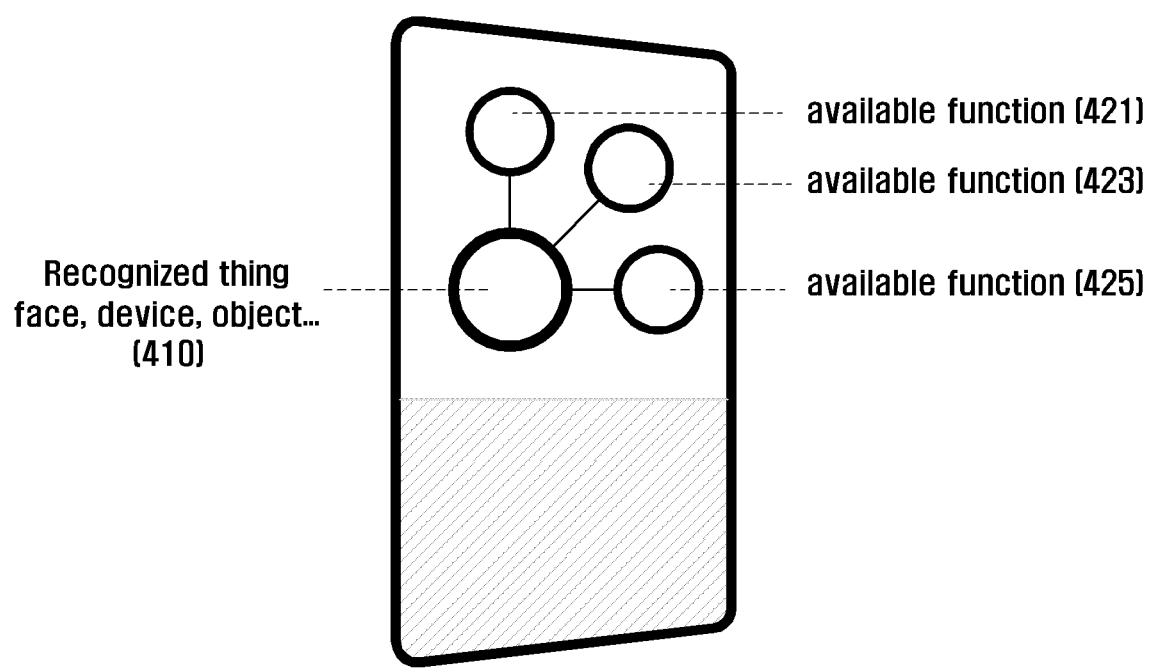
FIGS. 4A and 4B are diagrams illustrating examples of displaying a screen in which image information in a camera is recognized and a designated operation is performed in a related application.
Figure 4B:
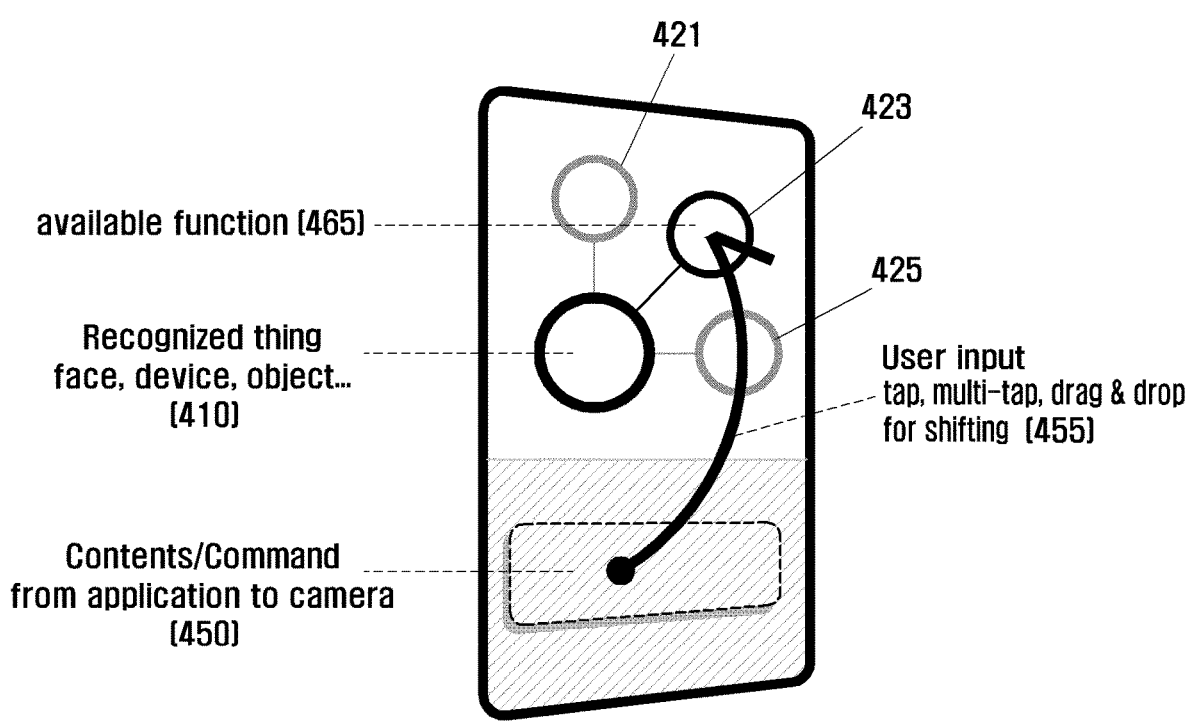
Figure 5A:
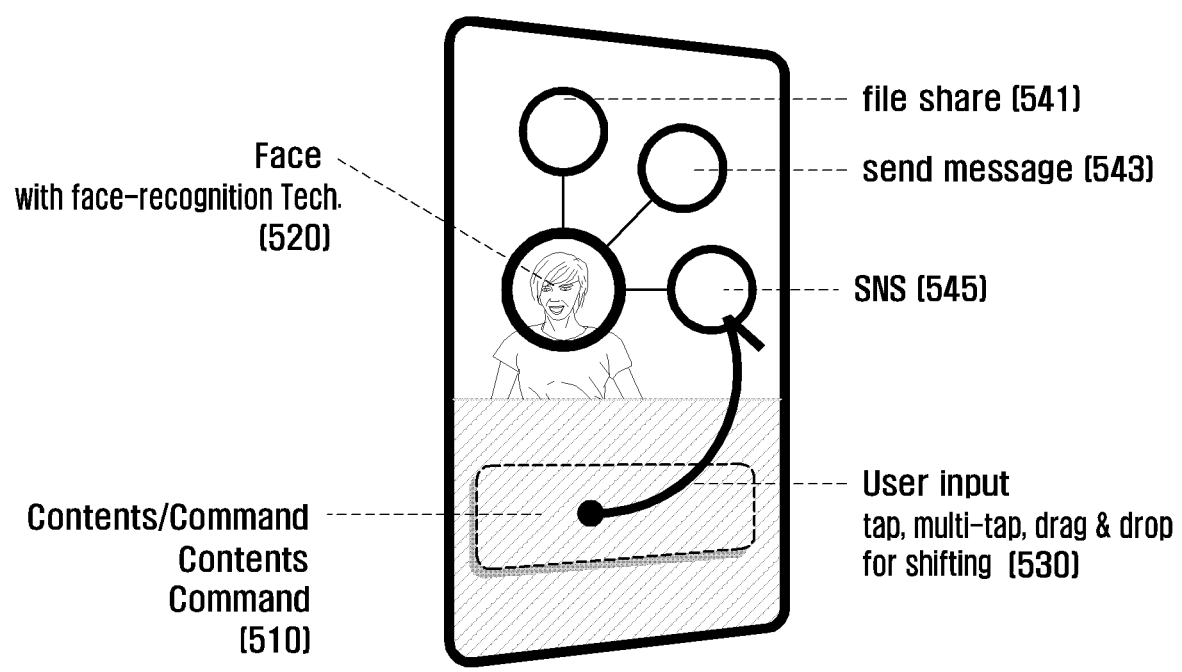
FIGS. 5A to 5C are diagrams illustrating an example in which a command is executed using recognized image information according to an embodiment of the present invention.
Figure 5B:
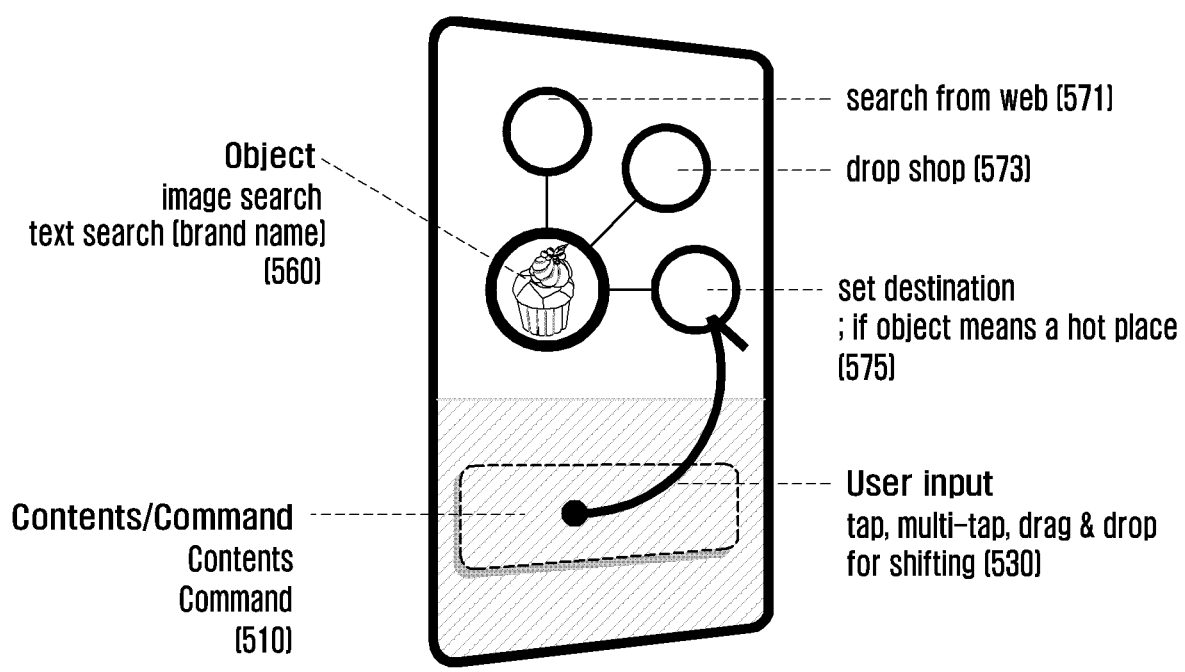
Figure 5C:
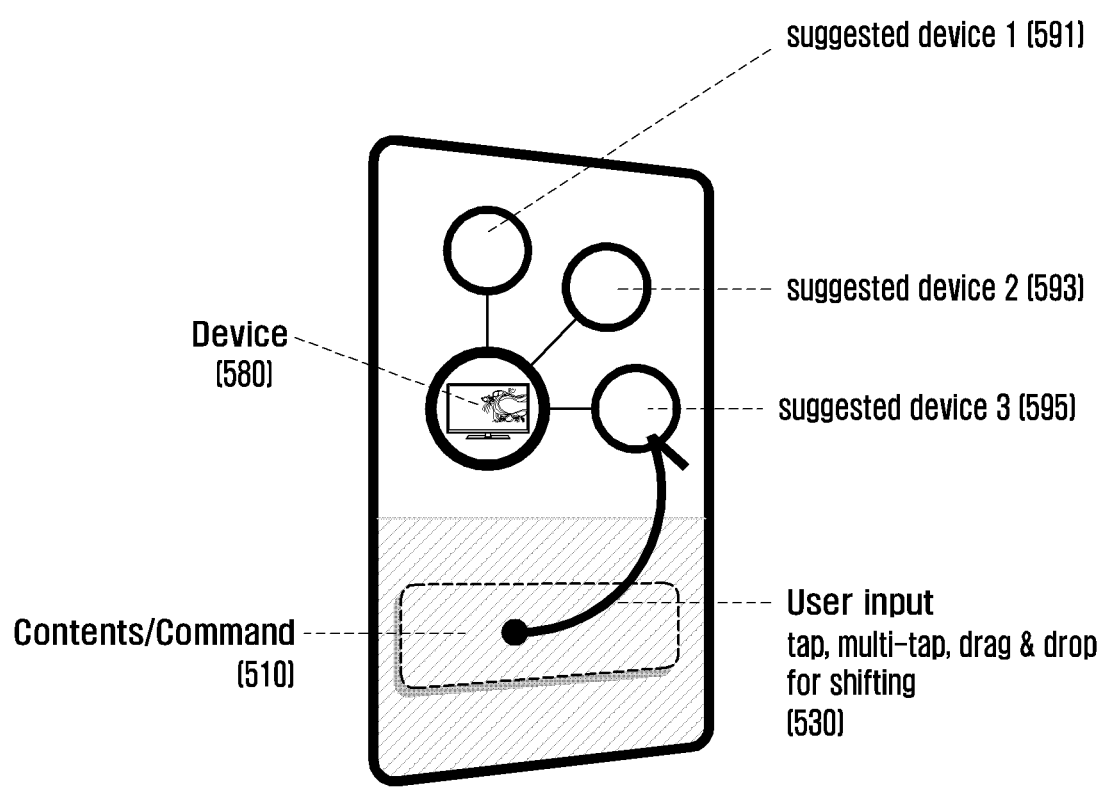

FIG. 2 is a flowchart illustrating an application processing procedure in a portable device according to an embodiment of the present invention, FIGS. 3A and 3B are diagrams illustrating examples of displaying screens of executed applications when two applications are executed, FIGS. 4A and 4B are diagrams illustrating examples of displaying a screen when image information in a camera is recognized and a designated operation is performed in a related application, and FIGS. 5A to 5C are diagrams illustrating an example in which a command is executed using recognized image information according to the embodiment of the present invention.

With reference to FIGS. 2, 3A to 3B, 4A and 4B, and 5A to 5C, the controller 100 executes a camera application in step 211. Before executing the camera application, the mobile device may be in a state of performing a content/file view function. Here, the content/file may be multimedia data such as a moving image, a still image, or music, or screen information such as a document or an Internet view. When displaying the content/file, the controller 100 may display a share via icon on the display unit 130. The share via icon includes a camera application menu according to the embodiment of the present invention, and the camera application menu is a menu for executing a camera application for sharing information between applications. The camera application for sharing the information may be executed in all applications in which the share via icon is displayed. In the description below, the camera application refers to an application for recognizing information on a preview image and executing a related application, and the related application may be a communication application executed by information which is recognized and provided from the camera preview image.

When the camera application is executed, the controller 100 displays a preview image output from the camera 120 in step 213, and further displays information generated by recognizing the preview image. When the camera application is driven, the controller 100 simultaneously displays a content/file view screen and the camera application on the display unit 130. FIGS. 3A to 3B are diagrams illustrating an example of screens displayed on the display unit 130 when the camera application and the content/file view application are executed simultaneously. Here, the application A may be a camera application, and the application B may be a content/file view application. The screen (screen layout) is displayed in a form of a main screen and a sub-screen, and in FIGS. 3A and 3B, it is assumed that a main screen 310 is a camera application screen, and sub-screens 320 and 330 are screens for the content/file view application. In this case, a screen of the content/file viewer application (Application B), which is a sub-application screen, has a structure for interworking the main screen and the sub-screen and occupies a part of the screen. The screen of the content/file viewer application may be displayed in a pop-up style as indicated by reference number 320 in FIG. 3A or in a split style as indicated by reference number 330 in FIG. 3B. Further, in FIGS. 3A and 3B, it is shown that the sub-screen is displayed on the lower portion of the main screen, but it may be configured that the sub-screen is displayed on any of the upper, lower, left, and right portions of the main screen field range. Further, the field range of the sub-screen 320 or 330 may be expressed in a different design, and may be flexibly changed in response to an input of a user. In addition, in FIGS. 3A and 3B, the content/file viewer application may be displayed as the main screen, and the camera application may be displayed as the sub-screen.

Therefore, the user may maintain the main screen of the currently used content/file viewer application and may display a preview image of the camera 120 as one screen on the display unit 130. The preview image of the camera 120 may be external information of the portable device, and the controller 100 recognizes the preview image as external information and transmits or reflects the recognized information to a related application. The controller 100 displays the preview image of the camera 120 and recognized information of the preview image in step 213. The recognized information of the preview image may be information on an external device, a person, or the like. The external device may be a device other than the portable device, for example, a device having a function for communication and display, such as a smart phone, a tablet PC, a portable computer, or a TV. The information of the external device may be text information (that is, information for identifying the device, such as a model number and a manufacturer of the device) and/or an external image of the device. At this point, in order to recognize the external device, the portable device according to the embodiment of the present invention stores identification information of the device and an external image of the device, and/or identification information for communication with the corresponding device on the storage unit 110. Furthermore, the information of the person may be information on a phone number, an email address, or an SNS of the corresponding person. The information on the person refers to information on contacts of people registered in the portable device, and the storage unit 110 may store images of the people or communication information (information on phone numbers, email addresses, and SNS) of the corresponding people.

The controller 100 determines whether the user selects a desired image area from the preview image in step 215, and if so, displays the recognized image information of the selected area in step 217. Here, the selected image may be the entire preview image or a part thereof. If the user does not make a selection in step 215, the controller returns to step 213. Hereinafter, the controller 100 executes a related application on the extracted information (information on an external device or information on a person) in step 219, connects the extracted information to the related application, and displays the extracted information on the display unit 130. Here, the related application can be a communication application. If the image recognition information is information on an external device, the controller 100 forms a communication link (for example, WiFi, Bluetooth, and NFC) with a corresponding device through the communication unit 150, and displays the information of the formed communication link on the display unit 130. Further, if the image recognition information is information on a person, the controller 100 executes a communication application (for example, MMS, an email, or SNS) corresponding to the selected communication information among communication information of the corresponding person and displays a screen for executing the communication application including the selected information on the display unit 130. The controller 100 then transmits the selected or displayed content/file through the executed application in step 221.

At this point, when the camera application is executed, the controller 100 recognizes a preview image output from the camera 120 in step 213, and displays the recognized information on the display unit 130 as illustrated in FIG. 4A. For example, as illustrated in FIG. 4A, if the preview image is a person, the person is recognized as indicated by reference number 410 and the controller 100 displays communication information indicated by reference numbers 421 to 423 that can perform communication with the corresponding person with reference to the contact information in the storage unit 110, as illustrated in FIG. 4A. If the user selects specific information such as that indicated by reference number 425 in a state in which a screen is displayed as illustrated in FIG. 4A, the controller 100 performs steps 217 and 219 to execute the related application corresponding to the selected information (that is, the communication application) and shares (applies) the recognized information with the related application.

A method of selecting information of a preview image of the camera 120 may be performed in various kinds of methods indicated by reference number 455 such as a tap, drag and drop, multi-tap, and auto focusing, as in FIG. 4B. First, referring to the method of selecting by a tap, when the user taps a specific image area in a preview image of the camera 120, the controller 100 performs the related application corresponding to the recognized information of the selected image. Second, if an operation of drag and drop is sensed, the controller 100 executes the related application corresponding to the dragged and dropped image information from the preview image of the camera 120. Third, referring to the method of selecting by multi-tap, if the user performs a multi-tap operation on the preview image of the camera 120, the controller 100 performs the related application corresponding to information on the selected images by the multi-tap. Fourth, a method of recognizing image information by auto focusing is described as follows. In a state in which the related application is executed, the user drives the camera 120 to focus an image area having desired information. In this case, the controller 100 recognizes the currently-executed related application and the area focused in the camera 120. Therefore, the controller 100 can recognize an image in the focused area and execute the related application.

In this manner, the related application can be executed using the information of the image selected from the preview image of the camera 120. At this point, the camera application and the related application is displayed on one screen as illustrated in FIG. 3A or 3B. Otherwise, the camera application can be processed on a background layer and the related application processed on a foreground layer.

FIGS. 5A to 5C are diagrams illustrating specific examples of a method of processing an application which is executed in a process as illustrated in FIG. 2 according to the present invention.

With reference to FIG. 5A, the controller 100 transmits or shares a file using face recognition. If execution of the camera application is requested in the share via menu, the controller 100 drives the camera 120 and displays the preview image output from the camera 120 on the display unit 130. Further, the controller 100 performs face recognition on the preview image as indicated by reference number 520. According to the face recognition result, the controller 100 lists applications (related applications) that can interwork with the corresponding person and displays the applications on the display unit 130. In FIG. 5A, it is assumed that the applications (related applications) that can interwork with the corresponding person are a file share 541, a send message 543 and SNS 545. At this point, if a specific application is selected by a user input 530, the controller 100 senses the user input, and displays and processes the corresponding application as indicated by reference number 510. A command generated at this point can be shifted into an operation convergence area of the related application, and the related application can attach and transmit a content/file desired to be transmitted. Here, if the related application includes a plurality of sub-applications (for example, in the case of SNS, 1. Facebook, 2. Path, 3. Twitter, and the like can be displayed) and the user selects the related application (for example, SNS), the controller 100 displays a connectable contact list (herein, the connectable contact list may be a list of SNSs). Further, in the related application selected as described above, the executed or selected content/file is attached and transmitted (that is, to a person with the recognized face as a recipient).

With reference to FIG. 5B, if the recognized object is not a person or a device (for example, an electronic device desired to be connected), the recognized command can be executed. That is, the controller 100 can display the image output from the camera 120 as the preview image on the display unit 130. Further, the controller 100 recognizes the preview image as indicated by reference number 560, and displays the related applications that can perform an operation depending on the recognized object as indicated by reference numbers 571 to 575. At this point, the recognized object can be a general image which is not a person or an electronic device. In this case, the controller 100 performs image search and/or text search (brand search) as indicated by reference number 560, and displays searched related applications as indicated by reference numbers 571 to 575.

Hereinafter, if the user input is sensed as indicated by reference number 530 from the user, the controller 100 drives the related application as indicated by reference number 510, and the related application selects a command shifting text with the command generated in the application as the operation convergence area of the camera, drags and drops the command shifting text on the recognized object, and stores the command shifting text as a tag with the image.

With reference to FIG. 5C, the controller 100 performs a device connection function using a convergence function. In this case, the controller 100 displays the preview image output from the camera 120 on the display unit 130, recognizes the preview image, and checks the object (a device desired to be connected) as indicated by reference number 580. At this point, candidates are presented as indicated by reference numbers 591 to 595 in order to define correct attributes of the recognized image (here, the device). At this point, among the presented devices (suggested devices) as indicated by reference numbers 591 to 595, if a special device (for example, as indicated by reference number 595) is selected by the user as indicated by reference number 530, the controller 100 is connected to the device selected by the user input among the candidate devices. Further, after the connection, the controller 100 shifts the generated command to perform transmission to the corresponding device. At this point, the command that can be operated with an external device may be file share, continue play, sync, and the like.

Figure 6A:
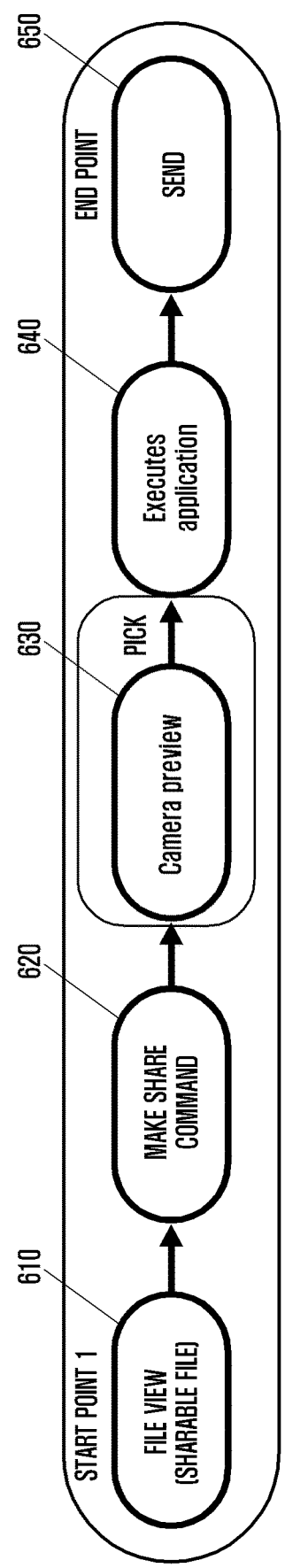
FIGS. 6A and 6B are diagrams illustrating methods of sharing/transmitting information between applications in the portable device according to an embodiment of the present invention.
Figure 6B:
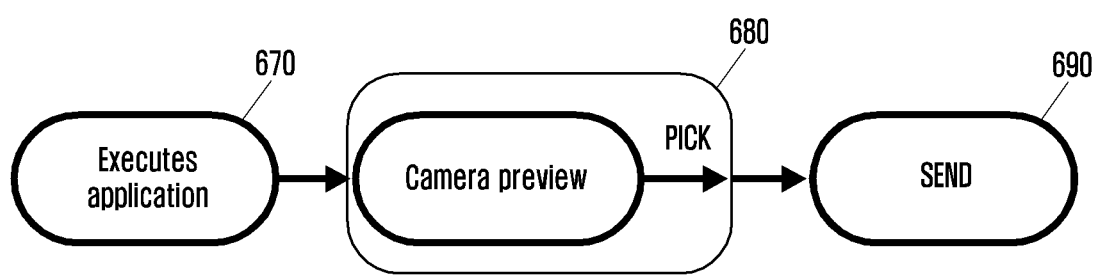

FIGS. 6A and 6B are diagrams illustrating methods of sharing/transmitting information between applications in the portable device according to an embodiment of the present invention.

With reference to FIGS. 6A and 6B, the related application can be executed by the information recognized by the camera application, and the camera application and the related application can be executed at the same time. In the former case, the process proceeds according to the steps illustrated in FIG. 6A.

First, in the state of displaying a file in step 610 of FIG. 6A, if a request for recognizing image information by driving the camera 120 is generated, the controller 100 senses this in step 620 and drives the camera 120 in step 630. At this point, the controller 100 recognizes the preview image output from the camera 120 and extracts (selects) information to be transmitted to the related application from the recognized image information in step 630, executes the related application in step 640, and transmits and reflects the extracted information to the related application in step 650.

Second, referring to FIG. 6B, in a state in which the related application is executed in step 670, the camera application can be executed as in step 680. In this case, the controller 100 recognizes the preview image output from the camera 120 and extracts (selects) information to be transmitted to the related application from the recognized image information in step 680, and transmits and reflects the extracted information to the related application in step 690.

Figure 7:
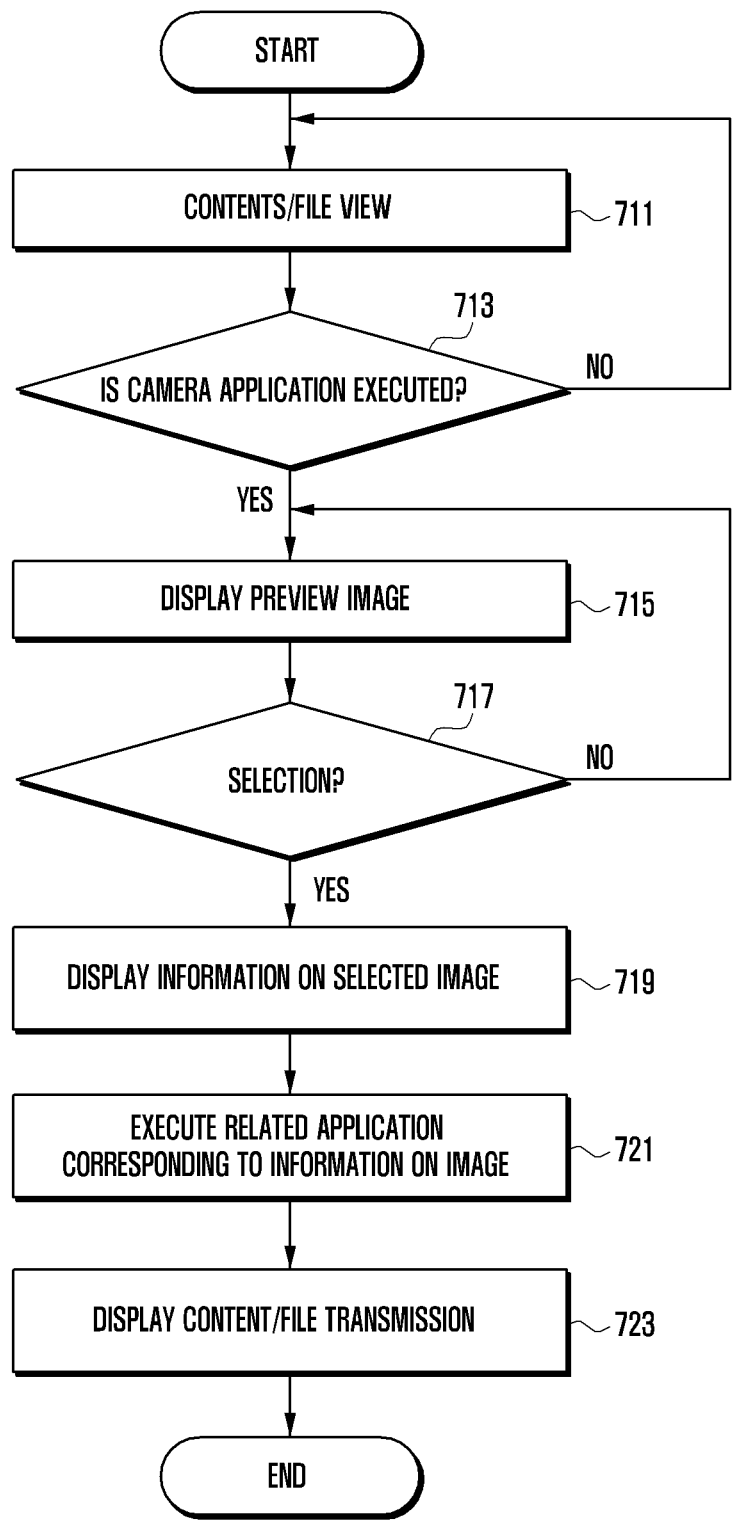
FIG. 7 is a flowchart illustrating a process of transmitting information according to an embodiment of the present invention.

FIG. 7 is a flowchart illustrating a process of transmitting information according to the embodiment of the present invention. Further, FIGS. 8A to 8B are diagrams illustrating information processed during performing the process as illustrated in FIG. 7.

Figure 8A:
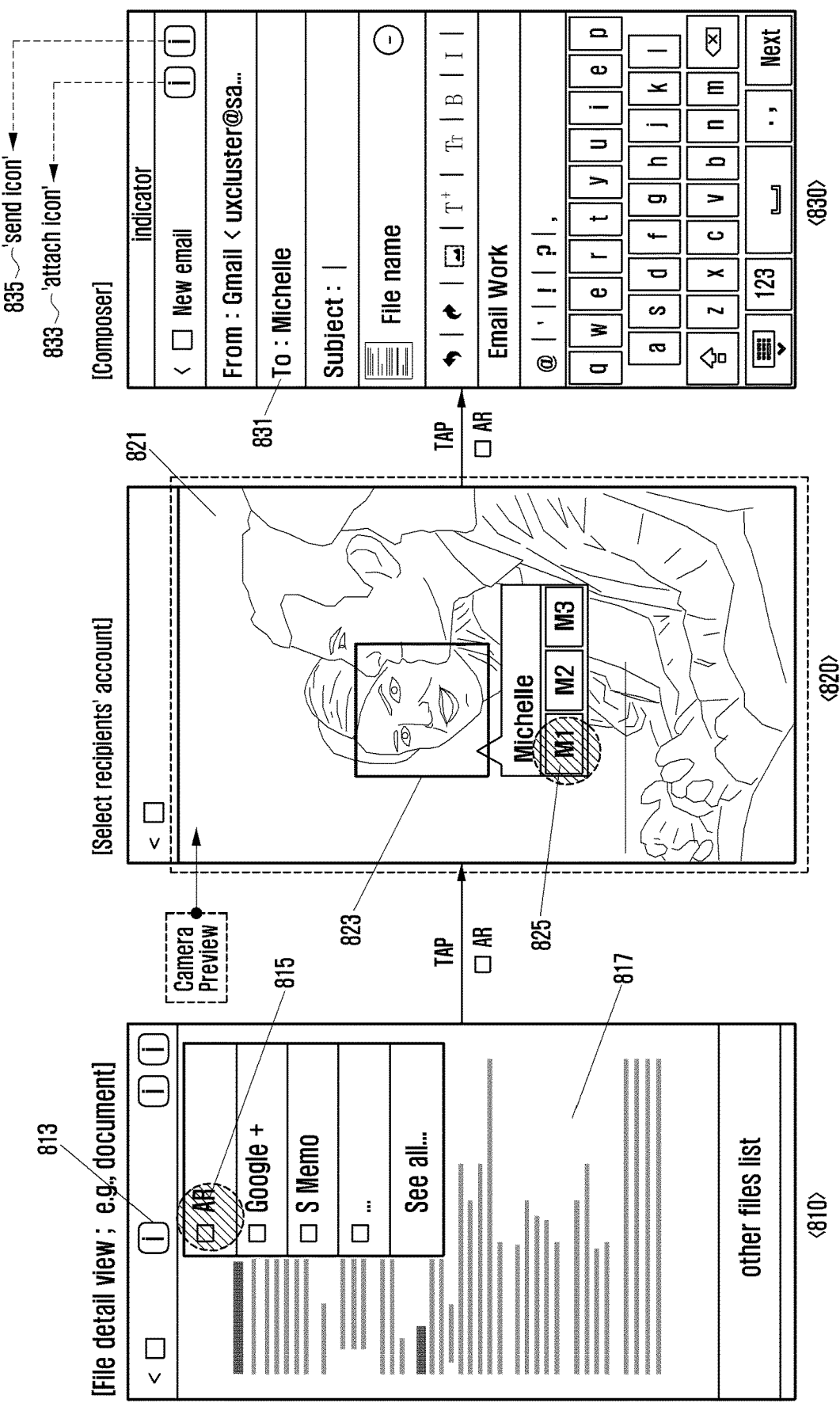
FIGS. 8A to 8B are screen views illustrating information processed during performing the process as illustrated in FIG. 7.
Figure 8B:
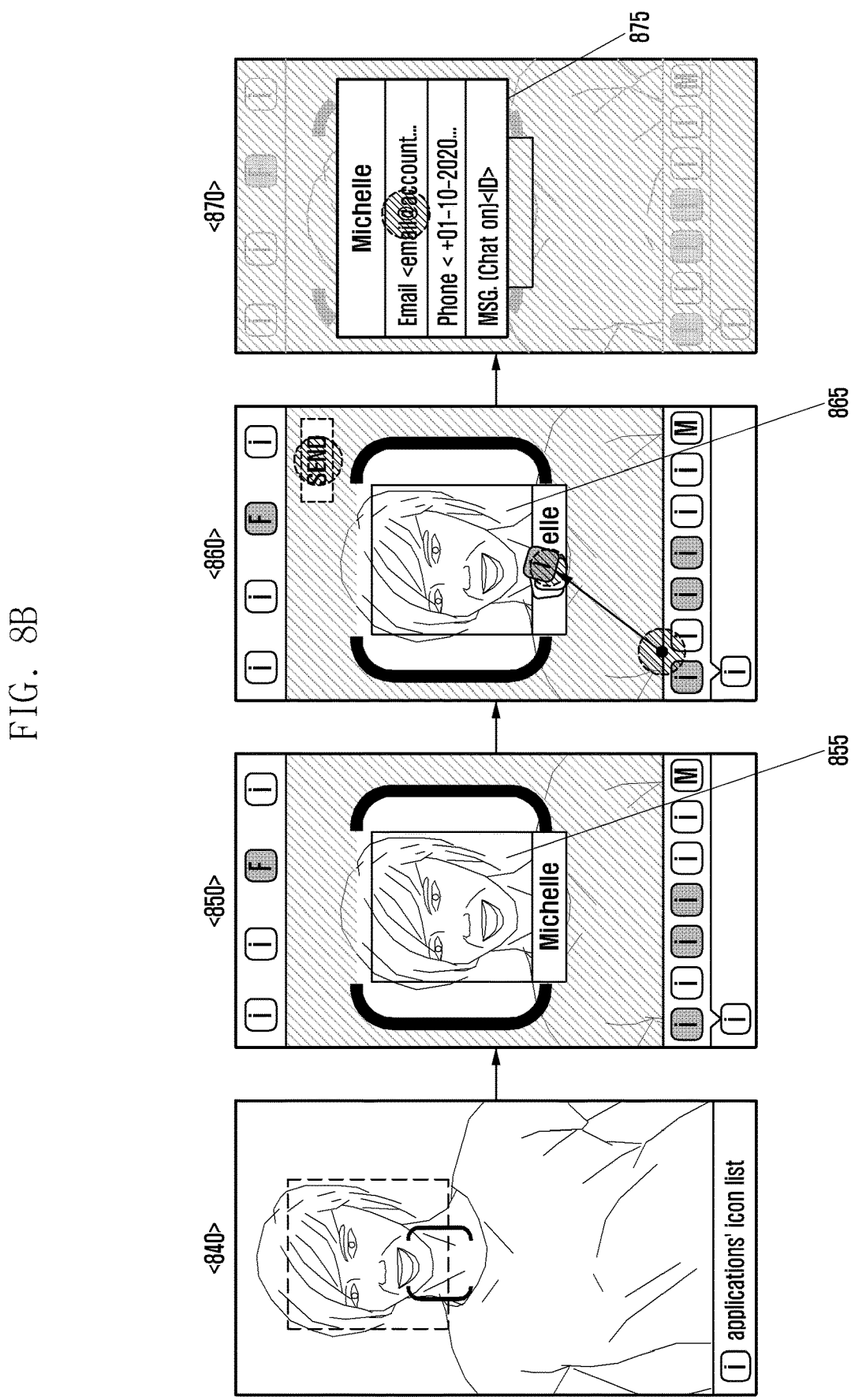

With reference to FIGS. 7 and 8A to 8B, the controller 100 performs a content/file viewing function and displays the content/file on the display unit 130 in step 711.

Here, when performing the content/file viewing function, the controller 100 displays an icon (for example, the share via icon, which can include the camera driving menu according to the embodiment of the present invention) for executing the camera application according to the embodiment of the present invention on the screen of the display unit 130. In the state as described above, the controller 100 determines if it is requested to execute the camera application for sharing the information with the related application in step 713. If the controller 100 senses the request in step 713, the controller 100 drives the camera 120 in step 715, and displays the preview image output from the camera 120 on the display unit 130. If not, the controller 100 returns to step 711. At this point, the screen displayed on the display unit 130 may be presented as illustrated in FIG. 3A or 3B under the control of the controller 100. In this case, the display unit 130 displays the content/file viewing screen and the preview image output from the camera 120. Further, as described above, when driving the camera application, the controller 100 can process the currently-executed related application on the background layer and the camera application on the foreground layer to display the preview image of the camera 120 on the screen of the display unit 130 in step 715. At this point, the controller 100 may recognize the preview image displayed on the display unit 130, and the related applications that can be driven according to the recognition result can be displayed.

At this point, if a related application is selected, the controller 100 recognizes the selection in step 717, displays the recognized information of the selected image in step 719, and executes the related application to connect (command shift) the information in step 721. Here, the method of selecting the image or the application may be performed by interaction such as a tap, drag & drop, or multi-tap as described above. Hereinafter, the controller 100 executes the related application and transmits or stores the content/file in step 723.

FIGS. 8A and 8B are screen views illustrating an operation of a processing content/file when the object is a person. Here, the controller 100 displays a file on the display unit 130 as illustrated by reference number 817 of the screen 810 in FIG. 8A in step 711. Here, the content/file can be contents such as a moving image or a still image or a file such as a document. Further, when displaying the content/file, the controller 100 displays a share via icon 813 that can select an execution menu 815 of the camera application according to the embodiment of the present invention. At this point, if the user selects (touches) the share via icon 813, the controller 100 displays a menu including the camera application icon (AR (Augmented Reality)) 815. If the user selects the camera application icon 815, the controller 100 senses the selection in step 713 and displays the preview image as indicated by reference number 821 in step 715. Here, it is assumed that the object of the preview image is a person as shown in screen 820. Then, the controller 100 recognizes the preview image in step 715, checks a person as indicated by reference number 823 (it is assumed that the person in the screen 820 is Michelle) corresponding to a facial image recognized from the contact list stored in the storage unit 110, and displays contact information as indicated by reference number 825 of the checked person. At this point, "M" in the contact information 825 of the person denotes a connection method. It is assumed that a method M1 is email, a method M2 is a phone service (MMS), and a method M3 is a messenger service (Facebook, Twitter, Chat on, and the like). If the user selects a desired connection method, the controller 100 senses the selection in step 717, displays the connection method (it is assumed that the method M1 is selected in FIG. 8A) of the selected image in step 719, executes the related application (here, the related application is an email application) corresponding to the connection method in step 721, and shares account information (here, an email address of the corresponding person) of the related application as shown in screen 830 and transmits a currently-processed file 817 in step 823. That is, if the specific contact information is selected on the screen 820, the controller 100 performs steps 719 to 723 of FIG. 7 to execute the related application corresponding to the selected contact information and transmit the content/file by using the related application.

The operation when the camera application captures an image of a person is described as follows with reference to FIG. 8B. The controller 100 displays a preview image of the camera 120 including a face of the person as shown in screen 840. Further, the controller 100 positions the face on the pointer of the preview image displayed like a portion 855 of a screen 850, recognizes the face on the position of the pointer, and displays the contact information of the recognized person like a portion 865 of a screen 860.

At this point, the contact information may be displayed to include the name and the connectable methods of the recognized face like the screen 820 of FIG. 8A. Here, the methods (M1 to M3 in the screen 820) can be email, a phone service (MMS), a messenger service (Facebook, Twitter, Chat on, or the like), and the like, and the order of the methods can be determined in a usefulness order (order confirmation). The method account may interwork with information registered in a database (for example, a phone book or a contact list), and one or more accounts can be connected to one method, and a plurality of methods can be selected. For example, if it is assumed that the contact information of the person includes one email address, one phone number, and three identifiers of SNS (Facebook, Twitter, and Chat on), the method M1 has one account, the method M2 has one account, and the method M3 has three accounts. At this point, if the user selects (presses or touches) a SEND icon in the screen 860, the controller 100 executes the related application corresponding to the touch interaction of the user and transmits the content/file through the related application. Here, the touch interaction may be drag and drop. In this case, the related application may be an application set as a default, and one account may be set.

However, if the information of the recognized person is selected in the screen 860, the controller 100 displays contact information of the corresponding person as indicated by reference number 875 in a screen 870, and if a desired method account among the displayed method accounts is selected, the controller 100 executes the application of the selected account to transmit the content/file.

For example, if the selected method account is email@account, the controller 100 senses the selection, executes the email application, and transmits the currently-processed (or selected) content/file with email@account as a recipient. Further, if the selected method account is MMS, the controller 100 senses the selection, executes the MMS application, and transmits the currently-processed (or selected) content/file with 01-10-2020-XXXX as a recipient.

In FIGS. 8A and 8B, it is assumed that the object is a person. However, the object may be another electronic device (an electronic apparatus having a communication function, such as a tablet, an MP3 player, a portable computer, a TV, or the like). In this case, the storage unit 110 stores contact information of the electronic device, and the contact information may be identification information of communication such as LTE (or CDMA), WiFi, NFC, Bluetooth, and the like that can form a communication link with the corresponding device. Therefore, in a state in which the content/file is displayed, if the user selects (touches) the share via icon 813, the controller 100 displays a menu that includes the camera application icon. At this point, if the user selects the camera application icon, the controller 100 displays the preview image output from the camera 120, and the preview image at this point may be an electronic device. Then, the controller 100 recognizes the electronic device in the preview image and displays contact information corresponding to the recognized electronic device from the contact list stored in the storage unit 110. The recognition method of the external device may be performed by using the external image of the device and/or a text image (a model number of the device, a manufacturer, or the like) described in the device. Here, the contact information may be a communication identifier that can form a communication link with the corresponding device. If the user selects a desired communication identifier, the controller 100 controls the communication unit 150 to execute a communication application corresponding to the selected communication identifier and transmit the currently-processed content when the communication link is formed.

For example, the user executes the camera application according to the embodiment of the present invention in a state in which the user watches a moving image through the portable device, and the user photographs a TV using the camera 120. Then, the controller 100 recognizes the TV in the preview image output from the camera 120. Thereafter, the controller 100 checks the communication identifier of the TV from the contact information, executes the communication application (for example, WiFi) by using the communication identifier, and tries to communicate with the TV. Then, if the communication link is formed, the controller 100 transmits the currently-processed moving image to the TV so that the moving image can be continuously reproduced through the TV.

The flowchart of FIG. 7 illustrates an example of driving a camera application in a state in which the content/file viewer is executed, recognizing information of a related communication application, executing the communication application according to the recognized information, and transmitting a content/file. However, after the camera application and the communication application using the camera application are executed, the content/file is selected and the content/file is transmitted. In this case, after the communication application is executed, the user can use an attach icon displayed on the display unit 130 to select the content/file, and the controller 100 can attach the file selected by the user to the communication application and transmit the file.

As described above, the portable device according to an embodiment of the present invention can configure one screen including a camera preview image for recognizing external information together with the related application, and can recognize and display only information appropriate for a state of the related application. Further, a communication application corresponding to the recognized image information as described above can be executed and the content/file displayed (or selected) can be transmitted using the communication application.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A portable communication device comprising:
   a camera;
   a touchscreen display;
   memory; and
   a processor configured to:
   display content in the touchscreen;
   display a sharing icon for sharing the displayed content in at least part of the touchscreen display;
   in response to a user selection of the displayed sharing icon, display a preview image obtained using the camera in a first region of the touchscreen display and the content in a second region of the touchscreen display, wherein the first region and the second region are displayed as a split screen of the touchscreen display;
   identify, in the preview image, an image object corresponding to an external object in response to obtaining the preview image from the camera;
   determine a category to which the image object belongs by using face recognition or image search;
   automatically display, in response to determining the category, via the touchscreen display, in the preview image, display information related to one or more specified applications of a plurality of specified applications associated with the preview image, the one or more specified applications being selected based at least in part on the category, wherein if the category relates to a person, the one or more specified applications comprise one or more applications for interworking with a contact of the person, and if the category relates to an external device, the one or more specified applications correspond to a communication identifier for forming a communication link with the external device;
   execute at least one specified application of the one or more specified applications; and
   transmit the displayed content based on contact information related to the external object through the executed at least one specified application.

2. The portable communication device according to claim 1, wherein the processor is further configured to:
   perform the identifying of the image object based at least in part on a user input.

3. The portable communication device according to claim 1, wherein the processor is further configured to:
   obtain, as at least part of the identifying the image object, information corresponding to the external object.

4. The portable communication device according to claim 3, wherein the external object includes the person, and
   wherein the processor is further configured to obtain, as at least part of the information, an email address, a phone number, or social network service (SNS) identification information corresponding to the person.

5. The portable communication device according to claim 3, wherein the external object includes the external device, and
   wherein the processor is further configured to obtain, as at least part of the information, communication link information to be used to establish a communication connection between the portable communication device and the external device.

6. The portable communication device according to claim 1, wherein the processor is further configured to select, as at least part of the executing of the at least one specified application, the content or a file to be displayed via the at least one specified application.

7. The portable communication device according to claim 1, wherein the processor is further configured to display the display information related to the one or more specified applications in the split screen or an overlay.

8. The portable communication device according to claim 1, wherein each of the plurality of specified applications is stored in the memory according to a corresponding category.

9. A computerized-method of operating a portable communication device, the computerized-method comprising:
displaying content in a touchscreen display operatively coupled with the portable communication device;
displaying a sharing icon for sharing the displayed content in at least part of the touchscreen display;
in response to a user selection of the displayed sharing icon, displaying a preview image obtained using a camera operatively coupled with the portable communication device in a first region of the touchscreen display and the content in a second region of the touchscreen display, wherein the first region and the second region are displayed as a split screen of the touchscreen display;
identifying, in the preview image, an image object corresponding to an external object in response to obtaining the preview image from the camera;
determining a category to which the image object belongs by using face recognition or image search;
automatically displaying, in response to determining the category, via the touchscreen display, in the preview image, display information related to one or more specified applications associated with the preview image, the one or more specified applications being selected based at least in part on the category from a plurality of specified applications stored in memory operatively coupled with the portable communication device, wherein if the category relates to a person, the one or more specified applications comprise one or more applications that for interworking with a contact of the person, and if the category relates to an external device, the one or more specified applications correspond to a communication identifier for forming a communication link with the external device;
executing at least one specified application of the one or more specified applications; and
transmitting the displayed content based on contact information related to the external object through the executed at least one specified application.

10. The computerized-method according to claim 9, wherein the identifying of the image object is performed based at least in part on a user input.

11. The computerized-method according to claim 9, wherein the external object includes the person, and
wherein the identifying of the image object further includes:
obtaining the contact information of the person.

12. The computerized-method according to claim 11, wherein the contact information of the person includes at least one of an email address, a phone number, or social network service (SNS) identification information.

13. The computerized-method according to claim 9, wherein the external object includes the external device, and
wherein the identifying of the image object further includes:
obtaining communication link information to be used to establish a communication connection between the portable communication device and the external device.

14. The computerized-method according to claim 9, wherein the displaying of the one or more specified applications further includes:
displaying the display information related to the one or more specified applications in the split screen or an overlay.

15. A non-transitory machine-readable storage device storing instructions that when executed by a processor cause the processor to perform a method comprising:
displaying content in a touchscreen display operatively coupled with a portable communication device;
displaying a sharing icon for sharing the displayed content in at least part of the touchscreen display;
in response to a user selection of displayed sharing icon, displaying a preview image obtained using a camera operatively coupled with the portable communication device in a first region of the touchscreen display and the content in a second region of the touchscreen display, wherein the first region and the second region are displayed as a split screen of the touchscreen display;
identifying, in the preview image, an image object corresponding to an external object in response to obtaining the preview image from the camera;
determining a category to which the image object belongs by using face recognition or image search;
automatically displaying, in response to determining the category, via the touchscreen display, in the preview image, display information related to one or more specified applications being associated with the preview image, the one or more specified applications selected based at least in part on the category from a plurality of specified applications stored in memory operatively coupled with the portable communication device, wherein if the category relates to a person, the one or more specified applications comprises one or more applications for interworking with a contact of the person, and if the category relates to an external device, the one or more specified applications corresponds to a communication identifier for forming a communication link with the external device;
executing at least one specified application of the one or more specified applications; and
transmitting the displayed content based on contact information related to the external object through the executed at least one specified application.

16. The non-transitory machine-readable storage device according to claim 15, wherein the identifying of the image object is performed based at least in part on a user input.

17. The non-transitory machine-readable storage device according to claim 15, wherein the external object includes the person, and
wherein the identifying of the image object further includes:
obtaining the contact information of the person.

18. The non-transitory machine-readable storage device according to claim 17, wherein the contact information of the person includes at least one of an email address, a phone number, or social network service (SNS) identification information.

19. The non-transitory machine-readable storage device according to claim 15, wherein the external object includes the external device, and
wherein the identifying of the image object further includes:
obtaining communication link information to be used to establish a communication connection between the portable communication device and the external device.

20. The non-transitory machine-readable storage device according to claim 17, wherein the displaying of the display information related to the one or more specified applications includes:
 displaying the display information related to the one or more specified application in the split screen or an overlay.

* * * * *